INVENTOR.
C. W. ROESCHKE
BY Roland A. Anderson
ATTORNEY

United States Patent Office

2,715,185
Patented Aug. 9, 1955

2,715,185

AUTOMATIC CONTROL SYSTEM

Conrad W. Roeschke, Albuquerque, N. Mex., assignor, by mesne assignments, to the United States of America as represented by the United States Atomic Energy Commission Application October 7, 1952, Serial No. 313,460

3 Claims. (Cl. 250—36)

This invention relates to an improvement in electronic stabilizing circuits and is particularly adapted to control the operation of a klystron oscillator. Frequency modulation about a controlled central frequency is desired in such operation, and this frequency is required to be maintained at the center of amplitude of the chosen oscillation mode.

The general object of the invention is therefore to provide means for stabilizing the operation of a klystron oscillator in a chosen mode of oscillation.

As is well known, the fundamental or central frequency of the klystron in any mode is determined by the voltage on the anode and on the repeller electrodes, and variations in the repeller voltage cause both frequency and power output to change. The invention provides an electronic regulating circuit which corrects for such variations in the voltages applied to the various electrodes, and this is also an object of the invention.

The composition of the invention and its manner of operation will be understood from the following description of a preferred embodiment of the invention read with reference to the accompanying drawings in which.

Figure 1:
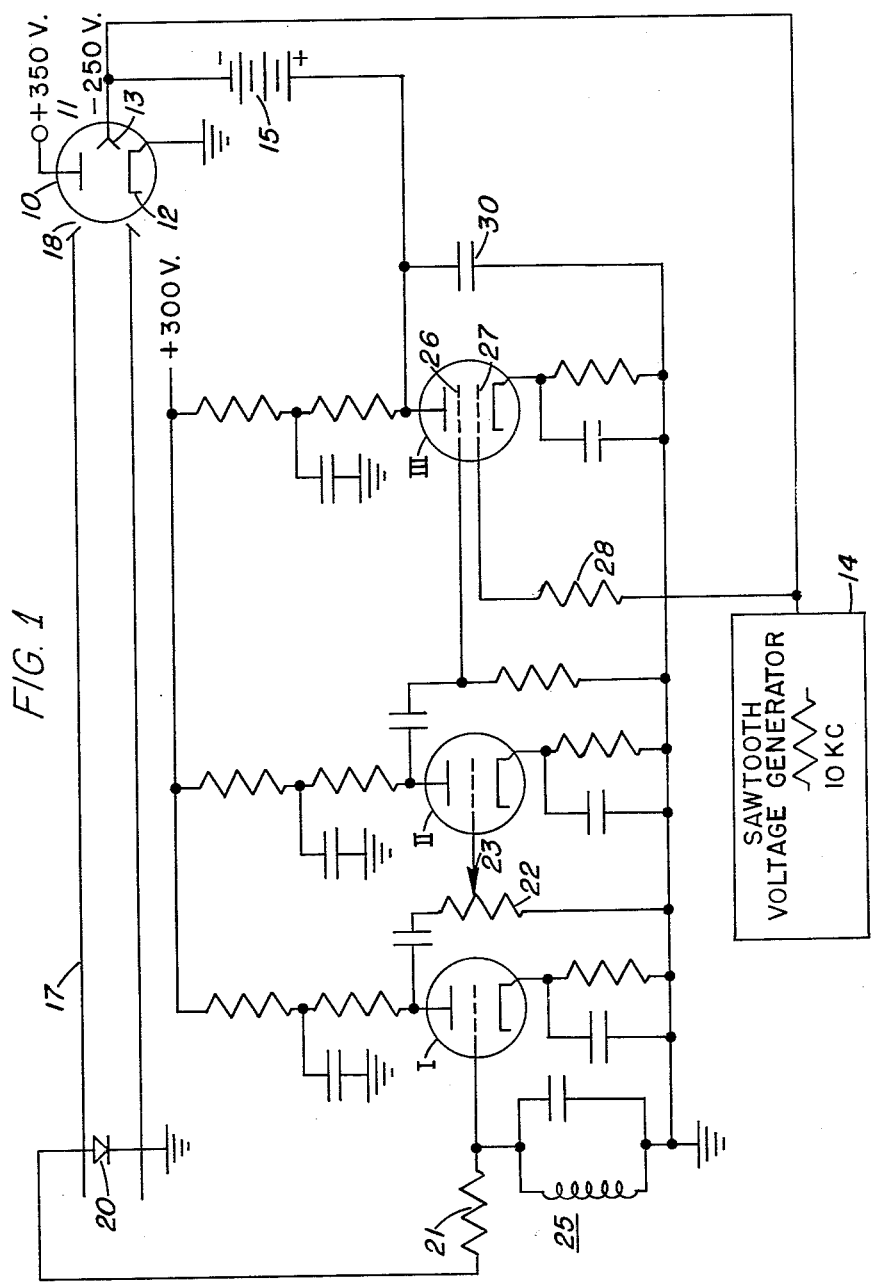
Fig. 1 is a schematic of the circuit of the invention.

Referring to Fig. 1, numeral 10 designates symbolically a klystron oscillator provided with anode 11, grounded cathode 12 and repeller electrode 13. Illustratively, klystron 10 may be assumed in oscillation at a convenient frequency and modulated in frequency and incidentally in amplitude at 10 kilocycles per second by saw-tooth voltage generator 14, with +350 volts on anode 11 and —250 volts on repeller 13 determining the fundamental frequency. The source of the anode voltage is not shown, while battery 15 supplies the negative repeller voltage. Let it be assumed that klystron 10 is now operating in a desired mode; stabilization of its operation requires that repeller voltage be corrected to compensate for changes in operating parameters.

Energy is radiated from klystron 10 through waveguide 17, of which the conventional connection to klystron 10 is symbolically represented at 18. At a convenient position in wave guide 17 is located a crystal or other type of detector 20, from which a 10 kilocycle signal is obtained.

The voltage control circuit to which the output of detector 20 is applied comprises two three-electrode vacuum tubes I and II for controllably amplifying the 10 kc. signal, and tube III, which is conveniently a 6AS6. Tubes I and II are capacity-resistance coupled, the input resistor of tube II being a potentiometer 22 on which a brush 23 selects a desired voltage for the grid of tube II.

Through resistor 21 the output of detector 20 is applied to the control grid of tube I, and tuned circuit 25 is in shunt between that grid and ground. Circuit 25 is sharply tuned to the modulation frequency; in the illustrative case assumed, this is 10 kc.

Tube III is provided with two grids, 26 and 27, as well as with the customary anode and cathode. The power supplies to anodes and cathode heaters are conventional. Grid 26 of tube III receives the output of tube II, which is the modulation signal from detector 20 amplified in tubes I and II. The modulating signal from saw-tooth generator 14 is applied by resistor 28 to grid 27, as well as being directly applied to repeller electrode 13. Thus in tube III the modulating voltage is mixed with the detected modulation of klystron 10.

Circuit parameters are so chosen that the negatively directed portion of the sawtooth wave on grid 27 drives tube III to cut off, while the positively directed portion of this wave is limited by resistor 28. The sawtooth wave itself is constant in frequency, phase and amplitude, and the voltage swing it produces at grid 27 is limited as just explained so that, with no signal on grid 26, tube III has a constant average anode current and anode voltage.

The anode voltage of tube III is applied to the positive terminal of battery 15, wherefore the negative voltage at the repeller electrode of the klystron is the algebraic sum of the negative battery voltage and the positive anode voltage of tube III. It is this sum which constitutes the —250 volts shown in the diagram of Fig. 1. Fluctuations of anode voltage are smoothed out by a large condenser 30 in shunt with the output of tube III. Accordingly, the voltage across condenser 30, algebraically added to the voltage of battery 15, is substantially constant unless disturbed by a voltage on grid 26. It will be recalled that circuit 25 is sharply tuned to the 10 kc. modulation frequency; voltages of other frequencies are shunted to ground.

Figure 2:
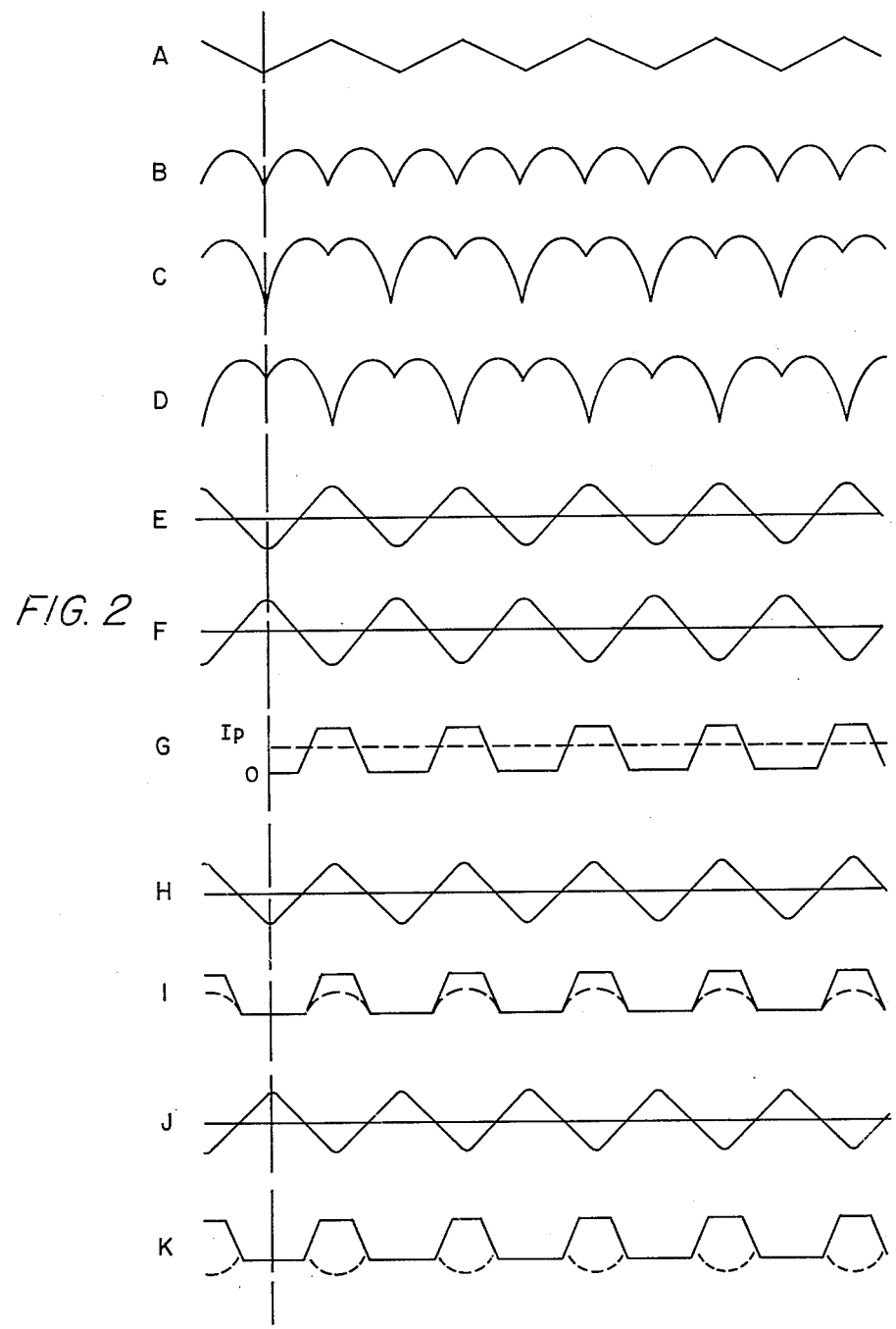
Fig. 2 shows time-voltage curves A to K characteristic of signals appearing in the circuit of Fig. 1.

The operation of the control circuit between detector 20 and condenser 30 is graphically set forth in Fig. 2, in which curve A represents the 10 kc. sawtooth wave applied to repeller 13 and through resistor 28 to grid 27 of tube III. When the klystron is operating in amplitude center of the chosen mode, the radio frequency energy is rectified by detector 20 to become curve B; this voltage has a fundamental frequency of 20 kc. and is shunted out by tuned circuit 25. No voltage then reaches grid 26, and the voltage at repeller 13 is unchanged, since the average anode voltage of tube III remains the same and its fluctuations are filtered out by condenser 30.

It is known that a slip of klystron operation to the low frequency side of the selected mode is corrected by making the repeller voltage more negative; making this voltage less negative corrects a slip to the high frequency side. Opposite slippages result in opposite phases of the detected voltage arriving at grid 26 relative to the voltage applied to grid 27.

Curve B is of the shape shown because, as is well known, the graph of klystron output versus repeller voltage is an arc, concave to the axis of repeller voltage, approximately symmetrical about a maximum when the repeller voltage is that corresponding to the desired mode. In this case the modulating voltage causes the power output to vary in accordance with the same graph. Each maximum of curve B occurs when the repeller voltage, as varied by the modulating voltage, passes through the value correspondent to maximum power, and this happens on both segments of a single cycle of the modulation. Thus the output of detector 20 is a series of similar arcs with cusps at each turning point of the modulating signal wave, curve B.

Likewise, it can be shown that when the unmodulated repeller voltage slips to less or greater than that corresponding to the maximum power the detector output becomes that shown in curve C or curve D respectively. Each of these curves corresponds to a voltage wave of fundamental frequency 10 kc. which will reach the control grid of tube I and eventually grid 26 of tube III. Tuned circuit 25 purifies each of these waves so that the succeeding circuit receives a sine wave of 10 kc. frequency, but opposite in phase in the two cases. Curves E and F correspond respectively to curves C and D. The phase difference between E and F is obviously 180 degrees.

The anode current in tube III, with only the sawtooth voltage wave on grid 27, would be as shown in curve G, varying between a maximum, limited by resistor 28, and zero when the tube is cut off. Suitable choice of tube parameters brings it about that under these circumstances the average anode current in tube III is constant, and the inclusion of condenser 30 substantially smooths out anode voltage variations and thus leaves unchanged the net repeller voltage.

However, when the signal of curve E or that of curve F is impressed on grid 26, a change comes about in the average anode current of tube III. When the klystron slips to the low side of the mode, voltage wave E alone produces a variation in anode current such as curve H, the same in phase and shape as curve E. Similarly, for wave F alone, the anode current varies as shown in curve J. Combining curve G with curves H or J, one finds curves I and K respectively, showing that for slip to the low side of the mode the average anode current increases while for the opposite slip it decreases. The increase or decrease in average anode current of tube III is graphically shown in curves I and K respectively. Condenser 30 is left out of consideration in each of curves G to K.

Taking into account condenser 30, it is seen that the variations accompanying waves I or K are smoothed, leaving the average anode voltage of tube III decreased or increased respectively. In the first case the negative repeller voltage is increased; in the second case decreased.

Slippage of the klystron is thus corrected by making more (or less) negative the repeller electrode when the slip is to the low (or to the high) side of the mode. The operation of the klystron is thus maintained at maximum power in the desired mode and at the desired frequency.

It will be understood that the choice of parameters may be made in known manner to establish the desired mode for the particular klystron used and that the magnitude of voltage waves E and F may be adjusted by the setting of brush 23 to provide the requisite compensating voltage changes at the anode of tube III.

I claim:

1. A system of apparatus for controlling the central frequency of a klystron oscillator operating in a chosen mode and provided at least with an anode, a grounded cathode and a repeller electrode comprising, in combination, sources of positive and negative voltages for the anode and the repeller electrode respectively, means for modulating the repeller voltage at a chosen frequency thereby correspondingly modulating the frequency and energy output of the oscillator, means for transmitting the energy radiated, detection means included in the transmitting means for deriving a voltage representing the modulation component of the transmitted energy to the exclusion of other components thereof including a parallel resonant circuit in shunt with the detection means and tuned to the modulation frequency, means for amplifying the voltage across the shunt circuit and a mixing circuit including a vacuum tube having an anode, two grids and a cathode, power supplies for said amplifying means and said vacuum tube, one of said grids receiving the amplified voltage while the other grid receives from the modulating means a voltage in phase with the modulating voltage, the anode-cathode path of said tube being in series with the source of repeller voltage.

2. A system of apparatus as in claim 1 including a condenser in shunt with the anode-cathode path of the vacuum tube.

3. Means for stabilizing the central frequency and power output of an electrical oscillator, said oscillator including a vacuum tube provided at least with an electrode the voltage on which controls said frequency and power output, comprising in combination a source of continuous voltage applied to the electrode, a source of alternating voltage of desired frequency, means for applying the second-named source to modulate the electrode voltage and thereby in frequency and magnitude the power radiated by the oscillator, means for propagating the modulated power including detector means for deriving from said power a voltage representing the modulation, means for restricting the detected voltage to the component of frequency that of the alternating voltage source, means for amplifying the restricted voltage, a vacuum tube having at least a cathode, two grids and an anode and having its anode-cathode path in series with the electrode voltage, power supply for said tube, means for applying the amplified voltage to one of said grids, means for applying to the other of said grids a voltage in phase with the modulated voltage and a capacitor shunting the anode-cathode path of said tube.

References Cited in the file of this patent

UNITED STATES PATENTS

| 2,462,294 | Thompson | Feb. 22, 1949 |
| 2,564,059 | Gensel | Aug. 14, 1951 |
| 2,640,156 | Schultz | May 26, 1953 |